United States Patent [19]

Smith et al.

[11] Patent Number: 5,539,025
[45] Date of Patent: Jul. 23, 1996

[54] STABLE, ONE-COMPONENT, CURABLE EPOXY/POLYAMIDE RESIN DISPERSIONS

[75] Inventors: George A. Smith, Newton, Pa.; Charles R. Frihart, Lawrenceville, N.J.

[73] Assignee: Union Camp Corporation, Princeton, N.J.

[21] Appl. No.: 405,535

[22] Filed: Mar. 16, 1995

Related U.S. Application Data

[60] Division of Ser. No. 110,063, Aug. 20, 1993, Pat. No. 5,428,083, which is a continuation-in-part of Ser. No. 694,726, May 2, 1991, abandoned.

[51] Int. Cl.$^6$ .............................. C08K 3/20; C08L 63/02
[52] U.S. Cl. .............................................................. 523/418
[58] Field of Search ................................................ 523/418

[56] References Cited

U.S. PATENT DOCUMENTS

| | | | |
|---|---|---|---|
| 2,705,223 | 3/1955 | Renfrew et al. | 260/18 |
| 2,811,495 | 10/1957 | Wittcoff et al. | 260/18 |
| 2,881,194 | 4/1959 | Peerman et al. | 260/404.5 |
| 2,899,397 | 8/1959 | Aelony et al. | 260/18 |
| 2,999,826 | 9/1961 | Peerman et al. | 260/18 |
| 3,377,303 | 4/1968 | Peerman et al. | 260/18 |
| 3,449,278 | 6/1969 | McKay et al. | 260/23 |
| 3,844,991 | 10/1974 | Ferraro et al. | 260/18 |
| 3,945,964 | 3/1976 | Hastings et al. | 523/406 |
| 3,956,208 | 5/1976 | Hoki et al. | 260/18 |
| 4,082,708 | 4/1978 | Mehta | 260/18 |
| 4,123,403 | 10/1978 | Warner et al. | 260/29.2 |
| 4,200,601 | 4/1980 | McClain | 264/9 |
| 4,853,421 | 8/1989 | Hayes | 523/223 |
| 5,025,043 | 6/1991 | Smith | 523/326 |
| 5,095,058 | 3/1992 | Smith et al. | 524/238 |

FOREIGN PATENT DOCUMENTS

| | | |
|---|---|---|
| 557651 | 5/1958 | Canada . |
| 0157478 | 2/1985 | European Pat. Off. . |
| 0327354 | 8/1989 | European Pat. Off. . |
| 0328301 | 8/1989 | European Pat. Off. . |
| 59-71339 | 4/1984 | Japan . |
| 62-148582 | 7/1987 | Japan . |
| 63-10643 | 1/1988 | Japan . |
| 1122810 | 8/1968 | United Kingdom . |
| 1275389 | 5/1972 | United Kingdom . |
| 1284775 | 8/1972 | United Kingdom . |
| WO92/16579 | 10/1992 | WIPO . |
| WO93/02125 | 2/1993 | WIPO . |

*Primary Examiner*—Melvyn I. Marquis
*Assistant Examiner*—D. Aylward
*Attorney, Agent, or Firm*—Woodcock Washburn Kurtz Mackiewicz & Norris

[57] ABSTRACT

Stable, one-component, curable epoxy resin and polyamide resin dispersions and methods for the preparation of the same are described, wherein the polyamide resin dispersion has a stability enhancing, water soluble, dipolar chemical moiety.

6 Claims, No Drawings

STABLE, ONE-COMPONENT, CURABLE EPOXY/POLYAMIDE RESIN DISPERSIONS

REFERENCE TO RELATED APPLICATIONS

This is a division, of application Ser. No. 08/110,063, filed Aug. 20, 1993, U.S. Pat. No. 5,428,083 which is a Continuation-in-part of Ser. No. 08/694,726, filed May 2, 1991.

BACKGROUND OF THE INVENTION

Curable compositions containing epoxy and polyamide resins are known in the art. For example, European Patent Application Publication No. 0 157 478 describes adhesive compositions prepared by mixing solid particles of polyamide resins with solid particles of epoxy resins. If desired, the composition also contains a polymeric binder. Prior to application as an adhesive, the polyamide and epoxy composition is preferably dispersed in a non-solvent.

Hastings et al., U.S. Pat. No. 3,945,964, describes stable aqueous emulsions of epoxy resins containing, as emulsifying agents, ethylene oxide propylene oxide block polymers of specified formulae. Curing agents described as useful with the epoxy resin emulsion include polyamides.

Aelony et al., U.S. Pat. No. 2,899,397, describes mixed aqueous emulsions of polyamide and epoxy resins prepared by mixing a solution of epoxy resinous material with a solution of polymeric polyamides, combining the two solutions in the presence of an aqueous medium containing a water soluble organic carboxylic acid and agitating the combined solutions to produce an emulsion.

Wittcoff and Renfrew U.S. Pat. No. 2,811,495 discloses mixtures of suspensoids of polyamide resins and complex epoxide resins, but there is no suggestion of the stability enhancing, water soluble, dipolar chemical moieties of the present invention.

One problem with many of the prior art epoxy/polyamide resin compositions, however, is the rapid reactivity of the mixed resins, producing in a relatively short amount of time an infusible, insoluble composition. Where such compositions are intended for use as laminating agents, adhesives, potting and casting resins, and the like, this brief reaction time requires that the resin mixture be prepared at point of use and in relatively small quantities. Attempts have been made to lengthen the shelf life of these compositions, however, such attempts have met with little success. In addition, relatively large amounts of volatile organic solvents used in these processes (i.e. toluene, isopropanol, methylethyl ketone) are flammable and environmentally undesirable.

New and/or better curable epoxy and polyamide resin compositions, particularly compositions having a longer and more stable shelf life, are needed. The present invention is directed to these important ends.

SUMMARY OF THE INVENTION

The present invention relates to a stable, one-component, curable system comprising, in combination:

(a) a stable, non-solvated, aqueous dispersion of an epoxy resin having unreacted epoxy groups; and (b) a stable, non-solvated aqueous dispersion of a polyamide resin having excess acid or amine groups, and at least one water soluble, dipolar chemical moiety in an amount effective to stabilize said aqueous dispersion; said water soluble, dipolar chemical moiety being one or more members selected from the group consisting of amino acids of the formula:

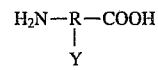

including anionic and cationic salts derived therefrom and mixtures thereof, wherein R represents an alkyl, alkenyl or aryl group of one to ten carbon atoms and Y is any polar or non-polar, ionic or non-ionic substituent; and (c) at least one surfactant selected from the group consisting of anionic, cationic and non-ionic surfactants; and The invention is also directed to a method for the preparation of a stable, one-component, curable system which comprises:

(a) preparing a stable, non-solvated, aqueous dispersion of epoxy resin having unreacted epoxy groups;

(b) preparing a stable, non-solvated, aqueous dispersion of polyamide resin having excess acid or amine groups and one or more stability enhancing moieties as further described above; and (c) blending said epoxy resin dispersion with said polyamide resin dispersion at a temperature between about 0° C. and 90° C.

DETAILED DESCRIPTION OF THE INVENTION

The present invention is practiced by first preparing a stable, non-solvated, aqueous dispersion of an epoxy resin having unreacted epoxy groups, and a stable, non-solvated aqueous dispersion of a polyamide resin having excess acid or amine groups, and further characterized by having at least one water soluble, dipolar chemical moiety in an amount effective to stabilize said aqueous dispersion; said water soluble, dipolar chemical moiety being one or more members selected from the group consisting of amino acids of the formula:

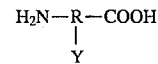

including anionic and cationic salts derived therefrom and mixtures thereof, wherein R represents an alkyl, alkenyl or aryl group of one to ten carbon atoms and Y is any polar or non-polar, ionic or non-ionic substituent. These moieties are typically amino acids, and include, e.g., para-aminobenzoic acid, glycine, lysine, arginine, phenylalanine and serine. Particularly preferred are glycine and para-aminobenzoic acid. Additionally, anionic or cationic salts derived from those amino acids and mixtures thereof may also be used to stabilize the aqueous dispersions of the polyamide resin. Mixtures of amino acids and the salts of amino acids may also be used to stabilize the aqueous dispersions.

In accordance with the present invention, stable aqueous dispersions of polyamide resin comprise at least one water soluble, dipolar chemical moiety. The moiety may be incorporated as a reactant during formation of a polyamide dispersion or may be incorporated into a dispersion after the formation thereof. It is preferred that polyamide resin dispersions comprise stability enhancing moiety upon formation. Thus, a predetermined amount of one or more of the moieties is added to the molten polymerized fatty acid polyamide resin, to the water, or to both the polyamide resin and the water. The added moiety should be effective to improve the stability of an aqueous dispersion of polyamide resin. In a particularly preferred method of preparing the polyamide resin dispersion, as described in detail further below, when the polyamide resin is heated to form a water-in-oil emulsion, which is then inverted by adding thereto an effective amount of inversion water, said water will have dissolved therein a dispersion-stabilizing amount of the water soluble, dipolar chemical moiety, e.g., glycine.

The term "polyamide resin dispersion" as used collectively herein is meant to include those dispersions of solid polyamide resin particles in water having average volume particle size of less than about 1 micron, referred to herein as "microdispersions," and those dispersions having average volume particle size of between about 1 and 20 microns, referred to herein as "regular dispersions." "Epoxy resin dispersions" as used herein refers to dispersions of epoxy in water, including liquid/liquid and solid/liquid dispersions, wherein the epoxy phase may comprise liquid droplets or solid particles. "Non-solvated" as used herein means that the epoxy and polyamide resin dispersions of the present invention contain no organic solvents in amounts sufficient to dissolve the respective resins. The term "stable", as used in connection with the separate polyamide and epoxy resin dispersions, refers to the stability of the separate dispersions, which when cooled to ambient temperatures, that is, room temperature, will not separate within 24 hours. The term "aqueous", as used in connection with the separate polyamide and epoxy resin dispersions, denotes a water-based dispersion.

There exist numerous types of polyamide resins having excess acid or amine groups which may be employed to form the aqueous polyamide resin dispersions used in the present invention. Polyamide resins are a well-known class of resins and include, for example, nylon-type polyamide resins and polymerized fatty acid polyamide resins. Preferably, the polyamide resins have an acid number of less than about 50 and an amine number of less than about 50. More preferably, the polyamide resins are polymerized fatty acid polyamide resins which have a cumulative acid and amine number between about 3 and 40, most preferred between about 5 and 20. The polymerized fatty acid polyamide resins and other polyamide resins suitable for use in the present invention can be obtained commercially or can be prepared by generally well known methods.

The term "polymerized fatty acid" as used in this specification is intended to be generic in nature and refers to polymerized acids obtained from fatty acids. The term "fatty acids" refers to saturated, ethylenically unsaturated and acetylenically unsaturated, naturally occurring and synthetic monobasic aliphatic carboxylic acids which contain from about 8 to about 24 carbon atoms.

For purposes of facilitating the explanation of this invention, specific references will be made to polymerized fatty acid polyamide resins which are obtained from unsaturated $C_{18}$ fatty acids. It should be appreciated, however, that the compositions and methods of this invention can likewise be practiced using other polymerized fatty acid polyamides, and of course other types of polyamides.

The preferred starting acids for the preparation of the polymerized fatty acids useful in the invention are oleic and linoleic acids because of their ready availability and relative ease of polymerization. Mixtures of these two acids are found in tall oil fatty acids making commercial tall oil fatty acids a convenient source of the starting materials. The fatty acids can be polymerized using various well known catalytic and noncatalytic polymerization methods. A typical composition of the polymerized fatty acids based on the $C_{18}$ tall oil fatty acids which are used as the starting materials for the polyamide resins employed in the present invention is as follows:

| $C_{18}$ monobasic acids (monomer) | 0–15% by wt. |
| $C_{36}$ dibasic acids (dimer) | 60–95% by wt. |
| $C_{54}$ trimer acid (or higher) or polybasic acids | 0.2–35% by wt. |

In the preparation of the polymerized fatty acid polyamide resins used in the present invention, it is preferable that the starting polymerized fatty acid contain as high a percentage of the dimer acid (the $C_{36}$ dibasic acid) as possible in order to obtain the optimum physical properties in the final product.

In addition to the polymerized fatty acids, a wide variety of dicarboxylic acids can be used in the preparation of the polymerized fatty acid polyamide resins employed in the present invention, including aliphatic, cycloaliphatic and aromatic dicarboxylic acids. Representative of such acids, which may contain from 2 to 22 carbon atoms, are oxalic, glutaric, malonic, adipic, succinic, suberic, sebacic, azelaic, pimelic, terephthalic, isophthalic, phthalic, naphthalene dicarboxylic acids and 1,4- or 1,3-cyclohexane dicarboxylic acids. Preferred dicarboxylic acids employed in the invention are straight chain aliphatic diacids having at least about 6 carbon atoms and more preferably about 6 to about 22 carbon atoms, such as azelaic, sebacic, and dodecanedioic dicarboxylic acids. It should be understood that use of the corresponding acid anhydrides, esters, and acid chlorides of these acids is included in the term dicarboxylic acid. Methods of preparing these preferred acids are well known, and many are readily available commercially.

Linear, branched, or cyclic polyamines are also used in the preparation of the polymerized fatty acid polyamide resins of the present invention and may be one or more of the well known aliphatic, cycloaliphatic or aromatic diamines having from about 2 to about 60 carbon atoms. Preferred are the alkylene diamines. Illustrative of the preferred diamines are ethylene diamine, 1,3-diaminopropane, 1,4-diaminobutane, terephthalyl diamine, known as p-xylene diamine, 1,6-hexamethylene diamine, methyl-1,5-pentamethylene diamine, methyl-1,9-nonane diamine, piperazine, 1-(aminoethyl)piperazine, 1,4-(bisaminoethyl)piperazine, 1,3-di-(1-piperidyl)propane, dimer diamine (diamine made from dimer acid), dipiperazine, 4,4' methylenebis (cyclohexylamine), 2,2-bis-(4-cyclohexylamine)propane, polyglycol diamines, isophorone diamine, isophthalyl diamine, known as m-xylene diamine, cyclohexanebis(methylamines), 1,4-bis-[2'-aminoethyl)benzene, 4,4'methylenebis (cyclohexylamine) and piperazine. These diamine compounds are all prepared by well known methods and many are commercially available. Preferred particularly are the straight chain aliphatic diamines of about 2 to about 20 carbons atoms, especially ethylene diamine and hexamethylene diamine, and cycloaliphatic diamines, especially 4,4'-methylenebis(cyclohexylamine) and piperazine. Monoamines may also be added to control molecular weight and functionality. Mixtures of polyamines, including triamines, can be used to obtain a good balance of properties.

Polyetherdiamines provide products with better flow properties. The most preferred polyetherdiamines include diamines made from propylene oxide polymers having molecular weights of from about 100 to about 8,000, diamines made from ethylene oxide polymers having molecular weights of from about 100 to 8,000, and diamines made from ethylene oxide/propylene oxide polymers having molecular weights of from about 100 to about 8,000. Other suitable polyetherdiamines include triamines made from propylene oxide polymers or ethylene oxide polymers and having molecular weights from about 100 to about 8,000.

In the method of the present invention, it is desirable to use as the polymerized fatty acid polyamide a material which is the result of a relatively complete amidation reaction between the starting polymerized fatty acid and the diamine. The degree of completion of the amidation process can be determined by evaluating the acid number and the amine number of the final polymer. The term acid number refers to the number of milligrams of potassium hydroxide required to neutralize the free acid in one gram of the polymer. The term amine number refers to the number of milligrams of potassium hydroxide equivalent to the free or excess amine groups present in the final polymer. The polymerized fatty acid polyamide resins having amine numbers of, for example, up to about 50, and acid numbers of, for example, up to about 50, are especially useful in the present invention.

As those skilled in the art would recognize, the number of free acid groups and free amine groups present in the polymerized fatty acid polyamide resin are directly related to the relative amount of the polymeric fatty acids, dicarboxylic acids and the diamines involved in the polymerization reaction and the degree of completion of the reaction. Thus, in preparing the low acid and amine number polyamides, approximate stoichiometric amounts of the polymerized fatty acids plus the dicarboxylic acids and the diamines based on the total number of available acid and amine groups should be used to prepare the polyamide resins for this invention and the reaction conditions should be selected to ensure substantial completion of the amidation reaction. The reaction conditions required for the amidation reaction are well known in the art with the reaction being generally conducted at temperatures from about 100° C. to about 300° C. for about 1 to about 8 hours.

In preparing the stable, non-solvated, aqueous dispersion of the polyamide resins, a number of techniques can be employed. Preferably, the resultant polyamide resin dispersion, prepared by whatever technique, has a high resin content. As used herein, the term high resin content denotes a resin content of at least about 20% by weight.

One dispersion technique found by the inventors to be useful in preparing "regular dispersions" of the polymerized fatty acid polyamide resin is as follows. The polyamide resin is first liquified by heating the polyamide resin to a temperature above its melting point, and more preferably to a temperature of at least about 5° C. above its melting point, but below the decomposition temperature of the polyamide resin. The liquification process is preferably conducted in a closed vessel under a protective blanket of inert gas such as nitrogen. The melting temperature of the polyamide resin will vary considerably depending upon the particular starting reactants employed to prepare the polyamide resin. Typically, however, the polymerized fatty acid polyamide resins will melt in the temperature range from somewhat below the boiling point of water to somewhat above the boiling point of water. If the temperature to which the molten polyamide resin will be heated for liquification is above the boiling point of water, the process equipment used must be capable of being operated at elevated pressures and temperatures. In a separate vessel, water is heated to a temperature which is preferably at least as high as the melting point of the polyamide resin which is to be dispersed, and more preferably at least about 5° C. higher than the melting point of the polyamide resin. Under these conditions, the water may be required to be heated and maintained under pressure in order to have sufficient temperature to be higher than the melting point of the polyamide resin. In an alternative method, the water can be heated to a temperature somewhat below the temperature of the polyamide resin and the polyamide resin heated to a temperature significantly above its melting point so that the resulting blend of water and polyamide resin will have a temperature above the melting point of the polyamide resin.

A surfactant, or combination of surfactants, is added to either the molten polyamide resin, or to the water, or to both the polyamide resin and the water, in a predetermined amount. The surfactant or combination of surfactants which are used in this dispersion technique are ones which will promote the emulsification of the molten polyamide resin and the water and which will also act to stabilize the final dispersion of the polyamide resin in the water. A wide variety of different types of surfactants can be successfully employed in this technique. The surfactants which should be selected are those which are capable of acting as water-in-oil emulsifying agents for the polyamide resin-water mixture. The surfactants should also act as oil-in-water emulsifying agents upon inversion of the emulsion. The surfactants include well known anionic, polar and nonpolar nonionic, and cationic surfactants.

The cationic surfactants which have been found to be especially useful in this polyamide resin dispersion technique are the alkyl ammonium salts such as: 1-hexadecyltrimethyl ammonium bromide or chloride; alkyl pyridinium salts such as 1-hexadecylpyridinium bromide and cetylpyridinium chloride; alkyl imidazolinium salts such as 1-hexadecylimidazolinium bromide; and the salts of tallow diamines, such as Jet Amine DT, tallow ammonium chloride salts, such as Jet Quat DT-50, ethoxylated tallow amines, such as Jet Amine DT-5, and the salts of tallow triamines, such as Jetco TRT (manufactured by Jetco Chemicals, Corsicana, Tex.).

Among the anionic surfactants which have been found to be especially useful are the sodium and potassium salts of fatty acids, the sodium and potassium salts of dimer acid or polymerized fatty acids, phosphate esters of fatty acids, and the sodium and potassium salts of rosin.

Among the nonionic surfactants which have been found to be especially useful are nonylphenol polyethoxyethanol, commercially available under the name Tergitol NP-40™ from Union Carbide Corporation, Danbury, Conn., and polyethoxylated castor oil, commercially available under the name GAF Emulphors™ from GAF Corporation, Wayne, N.J.

While not all surfactants are suitable for use in the dispersion of polyamide resins according to this technique, it has been found that a wide range of surfactants are suitable. It is relatively simple to screen suitable surfactants for such use. It was found, for example, that the preferred surfactants are those which exhibit outstanding ability to cause the emulsification of the liquified polymerized resin in the water. These surfactants are typically also highly effective in imparting a long term stability to the final dispersion.

The surfactants as indicated above are added either to the molten polyamide resin or to the water to be used in the dispersion process. The surfactant, however, is preferably added to the water because of the relative ease of addition. The relative amount of the surfactant added is based on the amount of the polyamide resin which is to be present in the final dispersion, and on the particular surfactant used. It has been found, however, that optimum results are generally obtained when the surfactant is used in an amount from about 0.2% to about 10% by weight, and preferably from about 0.2% to about 2% percent by weight, based on the weight of the polyamide resin.

In carrying out this polyamide resin dispersion technique, the liquified polyamide resin, the heated water and the surfactant are blended together in a predetermined ratio while maintaining the temperature of the individual components and the mixture above the melting point of the polyamide resin. In this regard, it is important that the equipment utilized in the initial blending step likewise be heated to appropriate temperatures to prevent the premature deposition of liquified polyamides on the equipment and a cooling of the blend of materials. The molten polyamide resin, the water and the surfactant are blended in ratios such that the resulting mixture of materials will contain from about 20% to about 60%, and preferably about 25% to about 40% by weight of the polyamide resin. The mixture is subjected to comminuting forces sufficient to form a finely divided emulsion in which the droplets of the molten polyamide resin have a volume average size distribution of 20 microns or less in diameter and more preferably 5 microns or less in diameter. Particle size distribution can be determined by a number of methods, such as sedimentation or laser light scattering techniques. The particular type of apparatus used for applying the comminuting force to the blend of the polyamide resin, water, and surfactant to some extent is a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers and the like. In general it is preferable for process purposes to run the blend through the comminuting equipment for one pass, in that this facilitates the manufacturing process. It should be appreciated, however, that the blend may be sent through the comminuting equipment for a number of passes in order to obtain the smaller size droplets. In general, the smaller the size of the liquid droplets, the more stable will be the resulting dispersions.

The final step in the foregoing polymerized fatty acid polyamide resin dispersion technique concerns cooling down the emulsion to a temperature below the melting point of the polymerized resin so as to cause the finely divided droplets in the emulsion to solidify into finely divided dispersed particles. The cooling is preferably conducted in a relatively rapid fashion so as to prevent coagulation of the particles during that portion of the solidification wherein the droplets become semi-solid and highly adhesive. Cooling of the emulsions prepared at super atmospheric pressures can be rapidly performed by pumping the emulsion through a heat exchanger or the like. Alternatively, or in addition to using a heat exchanger, the cooling can be caused by evaporation of water from a rapid reduction in the pressure.

The foregoing polymerized fatty acid polyamide resin dispersion technique is set forth in greater detail in U.S. Pat. No. 5,025,043, the disclosure of which is incorporated herein by reference, in its entirety. This technique will provide stable, non-solvated, aqueous polyamide resin dispersions suitable for use in the subject epoxy resin and polyamide resin composition.

Other polyamide resin dispersion techniques that will lead to stable non-solvated aqueous polyamide resin dispersions for use in the subject epoxy resin and polyamide resin composition, are described, for example, in U.S. Pat. No. 5,095,058, the disclosure of which is also incorporated herein by reference, in its entirety. As disclosed therein, aqueous polyamide dispersions having improved stability against phase separation and gelation are achieved by the addition to such dispersions of a water soluble, amphoteric chemical moiety, such as an amino acid, anionic or cationic salts of amino acid, or mixtures thereof, which exhibit dipolar character in aqueous media. In addition to methods for preparing the polyamide resin dispersions as described in the present application, other embodiments utilizing the polymerized fatty acid polyamide resins, neutralizing agents and surfactants (as described in the present application) are disclosed in U.S. Pat. No. 5,095,058. In one method described therein, a solid polymerized fatty acid polyamide resin is mixed with water, a neutralizing agent, and an amount of surfactant which will promote emulsification of the polyamide resin in water. The mixture is heated to a temperature at least as high as the resin softening point to form a water-in-oil emulsion which is inverted by adding thereto an effective amount of inversion water in which has been dissolved a dispersion stabilizing amount of glycine. The resulting emulsion of polyamide resin in water is then cooled below the resin's melting point, causing emulsified droplets of the polyamide resin to solidify as finely divided particles which are dispersed uniformly through the aqueous phase.

Polyamide resin "microdispersions" and methods for the manufacture thereof are discussed in WO 92/16579, published Oct. 1, 1992, the disclosure of which is incorporated herein by reference, in its entirety. The polyamide "microdispersions" disclosed therein also have improved stability against phase separation and gelation. Additionally, they are capable of forming clear, continuous films at ambient or near ambient temperatures.

The microdispersions are produced by first forming a water-in-oil emulsion by mixing together at a first temperature the polyamide resin, water, at least one surfactant, at least one co-surfactant, and a neutralizing acid or base, wherein the water and surfactant are present in amounts effective to form the water-in-oil emulsion, the co-surfactant is present in an amount effect to form the aqueous microdispersion, the neutralizing acid or base is present in an amount effective to neutralize residual acid or base in the polyamide resin, and the first temperature is effective to liquify the polyamide resin and to maintain an oil phase of a water and oil emulsion as a liquid.

The aqueous microdispersions are then formed by mixing together at a second temperature the water-in-oil emulsion and a second amount of water effective to form an oil-in-water emulsion. The oil-in-water emulsion is then cooled to a third temperature effective to form the aqueous microdispersions. At least one water soluble, dipolar, chemical moiety is added to either the oil-in-water emulsion at the second temperature or to the aqueous microdispersion, in an amount effective to stabilize the aqueous microdispersion. The chemical moiety, for example, is an amino acid, anionic and cationic salts derived therefrom, or mixtures thereof. Surfactants utilized in processes disclosed therein include well known anionic, polar and non-polar, nonionic, amphoteric, and cationic surfactants. The co-surfactants employed are preferably alcohols having up to 10 carbon atoms. Additional embodiments of methods for the preparation of the microdispersions, as well as more detailed discussions of materials used therein, are found in the application, which application is incorporated herein by reference.

The present invention also contemplates the use of other polyamide resin dispersion techniques known to those skilled in the art that will lead to a stable, non-solvated, aqueous polyamide resin dispersion suitable for use in the subject epoxy resin and polyamide resin compositions.

To prepare the compositions and practice the methods of the invention, stable, non-solvated, aqueous dispersions of epoxy resin having unreacted epoxy groups must also be prepared. There exists numerous types of epoxy resins having unreacted epoxy groups, that is, oxirane group containing compounds, which may be employed to form the aqueous epoxy resin dispersions used in the present invention. The phrase "epoxy resin having unreacted epoxy groups" is used herein to collectively refer to oxirane group containing compounds, and polymers and mixtures of these compounds with other materials. Such epoxy resins are well known in the art and can be obtained commercially or can be prepared by generally well known methods. Such epoxy resins include, but are not limited to, the diglycidyl ethers of bisphenol A (commonly referred to as DGEBA), brominated resins, epoxyphenol novolac and epoxy cresol novolac resins, and cycloaliphatic resins. These and other examples of epoxy resins suitable for use in the present invention are described, for example, in Lee and Neville, *Handbook of Epoxy Resins*, McGraw-Hill, Inc. (New York, 1967), the disclosures of which are incorporated herein by reference, in their entirety.

The preferred epoxy resins are those of the diglycidyl ethers of bisphenol A, (DGEBA) and those of the polyglycidyl ethers of novolac resins, which are typically derived from phenol-formaldehyde or cresol-formaldehyde. EPON 828™ is a liquid DGEBA resin (Shell Chemical Co., Houston, Tex.) having an epoxy equivalent weight of 185 to 192 and a viscosity in centipoises at 25° C. of 10,000–16,000. DEN 438 and 439 are epoxyphenol novolac resins having an epoxy equivalent weight of 170 to 210 and a viscosity in centipoises at 80° C. of 1,000–30,000, commercially available from Dow Chemical Company, Midland, Mich.

As will be apparent to those skilled in the art, the epoxy resin employed in the present invention can be dispersed to form a non-solvated aqueous epoxy resin dispersion using a number of techniques. Preferably, the resultant epoxy resin dispersion, prepared by whatever technique, has a high resin content as defined above, and more preferably, 40–70% by weight, based on the total weight of the epoxy resin dispersion.

One particularly preferred dispersion technique found by the inventors to be useful in preparing the epoxy resin dispersions used in the invention is as follows. First, the epoxy resin is liquified by heating to at least its melting point, and more preferably to a temperature of at least about 5° C. above its melting point, but below the decomposition temperature of the epoxy resin. The heating is preferably carried out with rapid stirring. The melting temperature of the epoxy resin will vary considerably depending upon the particular epoxy resin employed. Typically, however, most epoxy resins will melt at temperatures from below ambient to about 100° C. In a separate vessel, water is heated to a temperature which is preferably at least as high as the melting point of the epoxy resin which is to be dispersed, and more preferably at least about 5° C. higher than the melting point of the epoxy resin. In an alternative method, the water can be heated to a temperature somewhat below the temperature of the epoxy resin and the epoxy resin heated to a temperature significantly above its melting point so that the resulting blend of water and epoxy resin will have a temperature above the melting point of the epoxy resin. The water is generally added to the molten epoxy resin in a drop wise fashion, with rapid stirring.

A surfactant or combination of surfactants is added to either the molten epoxy resin, or to the water, or to both the epoxy resin and the water, in a predetermined amount. The surfactant or combination of surfactants which are used in this epoxy resin dispersion technique are ones which will promote the emulsification of the molten epoxy resin in the water and will also act to stabilize the final dispersion of the epoxy resin in the water. A number of different types of surfactants can be successfully employed in this technique. The surfactants which are selected are those which are capable of acting as oil-in-water dispersing agents for the epoxy resin-water mixture. The surfactants include well known anionic, polar and nonpolar nonionics, and cationic surfactants.

Preferably, the surfactants employed are of the nonionic type, most preferably the nonionic alkylaryl polyether alcohols such as those commercially available under the name Triton X-207™ and Triton X-405™ from Rohm and Haas Company, Philadelphia, Pa. Other suitable nonionic surfactants include ethylene oxide propylene oxide block copolymers, such as those disclosed in U.S. Pat. No. 3,945,964, the disclosures of which is incorporated herein in its entirety.

While not all surfactants are suitable for use in the dispersion of epoxy resins, as those skilled in the art will recognize, it is a relatively simple procedure to screen suitable surfactants for such use. It was found, for example, that the preferred surfactants are those which exhibit outstanding ability to cause the emulsification of the liquified epoxy resin in the water. These surfactants are also typically highly effective in imparting a long term stability to the final dispersion.

The surfactants as indicated above are added either to the molten epoxy resin or to the water to be used in the dispersion process. The surfactant, however, is preferably added to the water because of the relative ease of addition. The relative amount of the surfactant added is based on the amount of the epoxy resin which is to be present in the final dispersion, and on the particular surfactant used. It has been found, however, that optimum results are obtained when the surfactant is used in an amount from about 1% to about 25% by weight, and preferably 2% to about 10% by weight, based on the weight of the epoxy resin. The epoxy resin dispersions can also contain various additives in addition to the above-noted surfactants, such as protective colloids, viscosity modifiers and the like. Some examples are carboxy methyl cellulose, polyvinyl alcohol, polyethylene oxide and the like. The amount of such additives employed can vary in amounts from about 0.5% to about 10% based on the weight of the epoxy resin.

In carrying out this epoxy resin dispersion technique, the liquified epoxy resin, the heated water, and the surfactant are blended together in a predetermined ratio while maintaining the temperature of the individual components in the mixture above the melting point of the epoxy resin. In this regard, it is important that the equipment utilized in the blending step likewise be heated to appropriate temperatures to prevent the premature deposition of liquified epoxies on the equipment and a cooling of the blend of materials. The molten epoxy resin, the water and the surfactant are blended in ratios such that the resulting mixture of materials contains epoxy resin in an amount from about 20% to about 60%, and preferably about 40% to about 60% by weight, based on the total weight of the epoxy resin dispersion.

The final step in the foregoing epoxy resin dispersion technique concerns cooling down the emulsion. The cooling is preferably conducted in a relatively rapid fashion so as to prevent coagulation of the particles. Cooling of the emulsions prepared at super-atmospheric pressures can be rapidly performed by pumping the emulsion through a heat exchanger or the like. Alternatively, or in addition to using a heat exchanger, the cooling can be caused by evaporation of water from a rapid reduction in the pressure.

The foregoing epoxy resin dispersion technique will provide a stable, non-solvated, aqueous epoxy resin dispersion suitable for use in the subject epoxy resin and polyamide resin compositions. The present invention also contemplates the use of other epoxy resin dispersion techniques known to those skilled in the art that will lead to a stable, non-solvated, aqueous epoxy resin dispersion suitable for use in the subject epoxy resin and polyamide resin compositions. Epoxy resin dispersions can also be obtained commercially, such as Epi-Rez W55-5003, Epi-Rez W60-5520, Epi-Rez W60-3515, Epi-Rez 35201, and CMD W50-3519, all available from Rhone-Poulenc Inc., Louisville, Ky.

To prepare the stable, one-component, curable system of the invention, the foregoing stable, non-solvated, aqueous dispersion of an epoxy resin having unreacted epoxy groups and the stable, non-solvated, aqueous dispersion of a polyamide resin having excess acid or amine groups are blended together at a temperature below the melting point of the epoxy and polyamide resins in the dispersions. Preferably, blending occurs at a temperature of between about 0° C. to about 90° C., more preferably between about 10° C. to 50° C., most preferably at about 20° C. or ambient temperatures (that is, room temperature). Blending can be carried out in various fashions using techniques readily apparent to those skilled in the art. Varying ratios of epoxy resin to polyamide resin can be employed, but preferably the initial ratio of epoxy groups of the epoxy resin to the free amine or acid groups of the polyamide resin is greater than about 1:1 and less than about 10:1. It is more preferred if the ratio of epoxy groups to free amine or acid groups is greater than about 1:1 and less than about 5:1. The most preferred ratio of epoxy groups to free amine or acid groups is greater than about 1.5:1 and less than about 4:1.

The resulting combined epoxy and polyamide resin dispersions of the invention provide a one-component, curable system which exhibits exceptional stability. The polyamide and epoxy resin dispersions prepared in accordance with the present invention do not separate or significantly react with one another when allowed to stand at ambient temperatures (that is, at room temperature, about 20° C.) for twenty-four hours or more. For purposes of this specification the terms "stable", "stability", and variations thereof, as used in connection with the combined polyamide and epoxy resin dispersions of the invention, refer to the excellent shelf-life of the combined dispersions at ambient temperatures (that is, at room temperatures, about 20° C.) in that the combined dispersions will not separate from one another or significantly react with one another within twenty-four hours. It has been found, however, that the dispersions prepared in accordance with this invention typically will be stable over extremely long periods of time with stabilities in excess of six months not being uncommon. Furthermore, the dispersions of this invention do not require that the starting polyamide and epoxy resin dispersions be solvated.

The combined epoxy and polyamide resins have further advantages such as the elimination of the need for expensive organic solvents, elimination of organic solvent toxicity and associated fire hazards, less impregnation of films into porous surfaces such as paper, more ready handleability, etc. A further advantage of the combined dispersions of this invention is that once formed, they can be freeze-dried resulting in a finely divided powder which can be redispersed with minimal agitation to reform a stable dispersion. The excellent stability of the dispersions of this invention are further shown by the ability of the dispersions to undergo repeated freeze-thaw cycles without causing a breakdown on the dispersion. Of most importance, however, is the excellent stability or shelf life of the combined polyamide and epoxy dispersions. The combined polyamide and epoxy aqueous dispersions of this invention can contain, if desired, in addition to the above-noted materials, various additives. One particularly useful type of additive is stabilizing agents to prevent flocculation of the resin particles. Typical stabilizers include water soluble alkali metal salts of polymeric organic acids. The stabilizers can also include protective colloids such as lignin derivatives, proteins, water soluble cellulose derivatives, starch, alginic acid, and long chain alcohols and lecithin. The amount of stabilizing agent employed can vary in amounts from 0.5% to about 10% based on the weight of the polyamide resin. The dispersions may likewise contain other materials such as viscosity modifiers, plasticizers, dyes, pigments and the like. In this regard, it should be noted that the excellent stability of the resin dispersions of this invention allow substantial loadings of additives without adversely affecting the overall stability of the dispersions.

Chemical curing accelerators may also be present in the combined dispersions. Examples of such accelerators include bisphenol A, triphenylphosphite, phenolic resins, imidazole compounds, or the like.

A number of inert components may also be incorporated in the composition of the invention, as long as they do not adversely affect the shelf life of the resultant composition, or its ability to be employed in the particular use for which it is intended.

Numerous uses are available for the compositions of the invention. For example, the subject compositions may be used as wet stick adhesives, or may also provide excellent heat seal adhesives. The dispersions may also be used as beater or head box adhesives in the preparation of paper, and as protective or decorative coatings of various sorts. The dispersions may also be employed in the formulation of water-based paints, and may also have applications involving fabrication with glass fiber. The dispersions of the present invention may also be of value as structural adhesives for metal, wood, ceramics, glass and other rigid materials. They may also be used as binders for all sorts of particulate matter including cork, cellulosic materials, resinous materials, paper pulp, wood flour, asbestos fiber, textile fibers, clay, sand, plaster of Paris, pigments, leather, numerous waste materials, and the like. The subject dispersions also provide excellent impregnants for paper, textiles, leather and other porous surfaces.

The following Examples are given by way of further illustration of the present invention, and should not be construed as limiting the scope of the present invention as set forth in the appended claims. Examination of the examples and resulting data will show that the curable epoxy/polyamide resin dispersions of the present invention have significantly improved tensile properties at ambient temperatures or at 60° C. when compared to either the polyamide resins or polyamide resin dispersions. Additionally, the cured epoxy/polyamide resin dispersions are more solvent-resistant than the polyamide resin dispersions.

EXAMPLES

Example 1

A stable, aqueous dispersion of polyamide resin UNI-REZ 2636 (Union Camp Corp., Wayne, N.J.), comprising a major amount of short chain linear diamine and piperazine, and a minor amount of polyetherdiamine, was prepared as follows: 250 grams of UNI-REZ 2636 were charged to a 2 liter Parr reactor and heated to 160° C. with 500 rpm stirring. An aqueous solution containing 5 grams of Jet Amine DT (Jetco Chemicals Inc., Corsicana, Tex.), 2.5 grams glacial acetic acid and 65 grams of water was added slowly to the molten resin to form an initial water-in-oil emulsion. To invert the emulsion, a solution containing 1 gram of glycine in 680 grams of water was heated to 95° C. and added slowly to the initial emulsion. After all of the water was added, the emulsion was cooled to 25° C., thereby forming the dispersion, which was then filtered through a 50 micron polypropylene bag filter.

The resulting material was a white, fluid dispersion at 25% solids. The dispersion had a volume average particle size of 1.0 micron, as determined by light scattering, and showed no signs of separation even after high speed centrifugation.

Test Sample Preparation

Tensile Test Samples

About 27 g of the solid polyamide resin were placed in a Carver Laboratory Press apparatus. The resin was pressed at pressures and temperatures sufficient to obtain a pressed sample of uniform thickness. The pressed sample was stamped using a mallot and die to obtain samples for tensile tests. Tensile samples were tested at 23° C., after 24 hour storage at 23° C. and 50% humidity, and at 60° C., after 24 hour storage in 60° C. water. The tensile tests were conducted according to standard ASTM method D-638. The results of the tensile tests for the polyamide resin are found in Table 1.

The polyamide resin dispersion was freeze-dried to remove water, thereby yielding a fine, white powder. Samples for tensile tests were then prepared from the white powder as described above. Results of tensile tests for the polyamide resin dispersion are found in Table 1.

Solvent Double Rub Samples

Films of the resin dispersion were prepared by drawing down the polyamide resin dispersion on clear glass plates using a #6 Meyer rod. The films were allowed to dry and then were heat-cured in a forced air oven at 150° C. for 5 minutes. The films were then allowed to cool to room temperature. A solvent mixture of hydrocarbons and alcohols consisting of 2 parts 1-butanol, 1 part 2-propanol, and 1 part toluene was prepared. The initial films were then tested for chemical cross-linking using a solvent double rub test method as is known to those skilled in the art. Additional cured films were allowed to set at room temperature for one week, at which time final double rub tests were performed. The results of the solvent double rub test are found in Table 2.

Example 2

The dispersion prepared in Example 1 was blended with 10% (based on resin solids) Epi-Rez™ W55-5003 epoxy resin dispersion (Rhone-Poulenc, Inc., Louisville, Ky.) at ambient temperature using a simple paddle mixer. The resulting material was a white, fluid dispersion blend. The blend was stable over a period of several months with no signs of creaming or viscosity instability.

Samples of the epoxy polyamide dispersion blend were prepared for tensile testing and solvent double rub testing according to the methods described in Example 1. Results of those tests are found in Tables 1 and 2, respectively.

Example 3

A stable, aqueous dispersion of polyamide UNI-REZ 2643 (Union Camp Corp.), comprising short chain linear diamine and piperazine, was prepared as follows: 300 grams of UNI-REZ 2643 and 6 grams of Jet Amine DT (Jetco Chemicals Inc.) were charged to a 1.5 liter glass resin kettle and heated to 170° C. An aqueous solution containing 4 grams of glacial acetic acid in 50 grams of water was added dropwise to the molten resin/surfactant mixture with 570 rpm stirring to form an initial water-in-oil emulsion. To invert the emulsion, an aqueous solution containing 3 grams of glycine dissolved in 650 grams of water was added dropwise with moderate agitation. After all of the water was added, the emulsion was cooled to 25° C. with gentle stirring, thereby forming the dispersion, which was then filtered through 50 micron polypropylene bag material.

The resulting material was a white fluid, dispersion at 25% solids. The dispersion was very stable and showed no signs of separation after several weeks on the shelf.

Samples for tensile testing were prepared according to the method described in Example 1 from both the polyamide resin and polyamide resin dispersion. Results of those tests are found in Table 1.

Example 4

The dispersion prepared in Example 2 was blended with 10% (based on resin solids) Epi-Rez W55-5003 dispersion at ambient temperature using a simple panel mixer. The resulting material was a white, fluid dispersion blend. The resulting blend was stable with no signs of viscosity instability over several weeks at ambient conditions. Samples for tensile testing were prepared according to the method described in Example 1. Results of those tests are found in Table 1.

Example 5

A high amine number polyamide resin was prepared by reacting 125 equivalents of ethylene diamine (Aldrich Chemical Co.) with 100 equivalents of Dimer 18 (Union Camp Corp.) The resulting polymer had a ring and ball softening point of 94° C. and an amine number of 35. A polyamide resin dispersion was prepared from the polyamide resin according to the methods described in Example 1, using 2% Jet Amine DT (Jetco Chemicals Inc.), based on resin solids. The resulting material was a white, fluid dispersion at 40% solids and showed no signs of separation or gelation. Samples for tensile testing were prepared according to the method described in Example 1 from both the polyamide resin and the resin dispersion. Tensile tests were conducted at 23° C. Results are found in Table 1.

Samples for solvent double rub testing were also prepared from the polyamide resin dispersion according to the method described in Example 1. Results are found in Table 2.

Example 6

The polyamide resin dispersion of Example 5 was blended with 10 percent (based on resin solids) RDX 80204 epoxy dispersion (Rhone-Poulenc, Inc., Louisville, Ky.). The resulting epoxy/polyamide dispersion blend was stable and showed no signs of thickening over a 1 month period. Samples were prepared for tensile testing at 23° C. and for solvent double rub testing according to methods described in Example 1. Test results are found in Tables 1 and 2, respectively.

Example 7

The polyamide dispersion of Example 5 was blended with 30 percent (based on resin solids) RDX 80204 epoxy dispersion (Rhone-Poulenc, Inc.). The resulting epoxy/polyamide dispersion blend was stable and showed no signs of thickening over a one month period. Samples were prepared for solvent double rub testing according to the method described in Example 1. Results are found in Table 2.

Example 8

A stable, epoxy resin dispersion was prepared as follows. 200 grams Epon 828 (Shell Chemical Co., Houston, Tex.), 1 gram Triton X-207 (Rohm and Haas, Philadelphia, Pa.), and 2.5 grams Triton X-405 were charged to a glass resin kettle. The mixture was heated to 80° C. and 200 grams of water were added dropwise with 600 rpm stirring to form an emulsion. The emulsion was allowed to cool to 25° C., thereby forming the dispersion, which was then filtered through 50 micron bag material.

The resulting material was a white, fluid dispersion. This sample showed a slight degree of separation upon standing, but could be redispersed with mild agitation.

Example 9

A stable, polyamide resin dispersion of UNI-REZ 2646 (Union Camp Corp.), comprising short chain linear diamine and piperazine, was prepared according to the method described in Example 1, using 1% Tryfac 5556 (Henkel Corp., Mauldin, S.C.), based on resin solids. Samples for tensile testing at 23° C. were prepared according to the method described in Example 1 from both the polyamide resin and the resin dispersions. Results are found in Table 1.

Example 10

The polyamide resin dispersion of Example 9 was blended with 10 percent (based on resin solids) of the epoxy resin dispersion prepared in Example 8. The resulting material was a tan colored, fluid dispersion which was stable for several weeks. Samples were prepared for tensile testing at 23° C. according to the method described in Example 1. Results are found in Table 1.

TABLE 1

| | TENSILE DATA | | | |
| --- | --- | --- | --- | --- |
| | 23° C. | | 60° C. | |
| Sample | Break Stress psi | Break Strain % | Break Stress psi | Break Strain % |
| Example 1 | | | | |
| Polyamide Resin | 301 | 444 | 116 | 213 |
| Polyamide Dispersion | 268 | 270 | 85 | 114 |
| Example 2 | 1271 | 751 | 901 | 769 |
| Example 3 | | | | |
| Polyamide Resin | 324 | 160 | 186 | 147 |
| Polyamide Dispersion | 328 | 142 | 215 | 151 |
| Example 4 | 2370 | 502 | 1867 | 594 |
| Example 5 | | | | |
| Polyamide Resin | 386 | 23 | | |
| Polyamide Dispersion | 264 | 376 | | |
| Example 6 | 958 | 258 | | |
| Example 7 | 1752 | 54 | | |

TABLE 1-continued

| | TENSILE DATA | | | |
| --- | --- | --- | --- | --- |
| | 23° C. | | 60° C. | |
| Sample | Break Stress psi | Break Strain % | Break Stress psi | Break Strain % |
| Example 9 | | | | |
| Polyamide Resin | 577 | 120 | | |
| Polyamide Dispersion | 433 | 65 | | |
| Example 10 | 1112 | 358 | | |

TABLE 2

| | SOLVENT DOUBLE RUB[1] DATA | |
| --- | --- | --- |
| Sample | Initial | One Week |
| Example 1 Dispersion | 15 | 15 |
| Example 2 | 13 | 100 |
| Example 5 Dispersion | 14 | 14 |
| Example 6 | 32 | >100 |
| Example 7 | >100 | >100 |

[1]Number of Cycles

What is claimed:

1. A method for preparing a stable, curable epoxy resin and polyamide resin composition comprising:

(a) preparing a stable, non-solvated, aqueous dispersion of epoxy resin having unreacted epoxy groups;

(b) preparing a stable, non-solvated, aqueous dispersion of polyamide resin with excess acid or amine groups and having at least one water soluble, dipolar chemical moiety in an amount effective to stabilize said aqueous dispersion; said water soluble, dipolar chemical moiety being one or more members selected from the group consisting of amino acids of the formula:

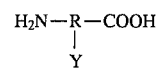

including anionic and cationic salts derived therefrom and mixtures thereof, wherein R represents an alkyl, alkenyl or aryl group of one to ten carbon atoms and Y is any polar or non-polar, ionic or non-ionic substituent; and (c) blending said epoxy resin dispersion with said polyamide resin dispersion at a temperature between about 0° C. and 90° C.

2. A method according to claim 1 wherein the amino acid is glycine.

3. A method according to claim 1 wherein said polyamide resin has a low acid and a low amine number.

4. A method according to claim 1 wherein said polyamide resin is a polymerized fatty acid polyamide resin.

5. A method according to claim 1 wherein said epoxy resin dispersion and said polyamide resin dispersion each have a resin content of at least about 20% by weight.

6. A method according to claim 1 wherein said epoxy resin and polyamide resin dispersions are blended at room temperature.

* * * * *